United States Patent [19]

Riusech

[11] 4,193,711
[45] Mar. 18, 1980

[54] FLOW CONTROL VALVE FOR SUBSURFACE IRRIGATION SYSTEM

[76] Inventor: Sergio Riusech, 2970 NW. 27 St., Miami, Fla. 33142

[21] Appl. No.: 193

[22] Filed: Jan. 2, 1979

[51] Int. Cl.² .......................... E02B 13/00; B02B 1/20
[52] U.S. Cl. ...................................... 405/39; 239/542; 405/43
[58] Field of Search ...................... 405/43, 44, 45, 47, 405/48, 51, 36, 39; 239/542, 546

[56] References Cited

U.S. PATENT DOCUMENTS

| | | | |
|---|---|---|---|
| 3,292,378 | 12/1966 | Rosenthal et al. | 405/48 |
| 3,442,087 | 5/1969 | Riusech | 405/39 |
| 4,147,307 | 4/1979 | Christy et al. | 239/542 |

FOREIGN PATENT DOCUMENTS 884564 12/1961 United Kingdom ..................... 405/43

Primary Examiner—Alexander Grosz

[57] ABSTRACT

An improved valve for a subsurface irrigation system which valve includes a foot with a pair of oppositely facing laterally opening holes. The foot is sized to extend through a hole in the bottom surface of a pipe of the system and has an upstanding leg of flexible material to be received within the pipe in a flexed condition; the leg has a longitudinal passageway to deliver fluid flowing in the pipe to the holes in the foot; to the leg, a flexible tube extension is fitted to extend within the pipe and which is of a preselected length, to present predetermined resistance to the water flow, so that the water distribution from the system may be generally equalized by selecting the proper length tube extension.

6 Claims, 5 Drawing Figures

FLOW CONTROL VALVE FOR SUBSURFACE IRRIGATION SYSTEM

FIELD OF THE INVENTION

This invention relates to subsurface irrigation and, more particularly, to an improved valve for use in a subsurface irrigation system of the type described more fully hereinafter.

BACKGROUND OF THE INVENTION

U.S. Pat. No. 3,442,087 describes a subsurface irrigation system which includes valve means for the distribution of water to moisten soil beneath the surface in which the system is embedded. A subsurface system has the advantage of not wasting a substantial percentage of water to evaporation. This invention is of an improved valve which may be utilized in such a system, i.e., a system which is composed of a plurality of parallel pipes each with a plurality of downwardly opening spaced holes therealong. The system is used for applying water beneath the surface so that the roots of the plants are conveniently moistened or fertilized. A problem has been the delivery of relatively similar amounts of water from each hole so that as a whole the water delivery in a given time period by the system in a field is not such as to overwater one portion excessively in relation to other portions of the field. This invention is of a flow control valve to be included in each of the holes of the pipes of the system.

OBJECTS OF THIS INVENTION

It is, accordingly, an object of this invention to provide an improved flow control valve structure for use in a subsurface irrigation system which is simple and inexpensive to manufacture, which is adapted to be easily installed and is designed to control the water flow characteristics of the system so that generally the water distribution from the system in a field is similar throughout the field in the sense that one portion is not overwatered excessively in relation to other portions of the field.

It is a general object of this invention to provide a valve structure for a subsurface irrigation system of the type described herein which is simple and inexpensive to manufacture and which is well adapted for the purposes which are set forth more fully hereinafter.

In accordance with these and other objects which will become apparent hereinafter, the instant invention will now be described with reference to the accompanying drawings, in which:

DESCRIPTION OF THE PREFERRED EMBODIMENT

Figure 1:
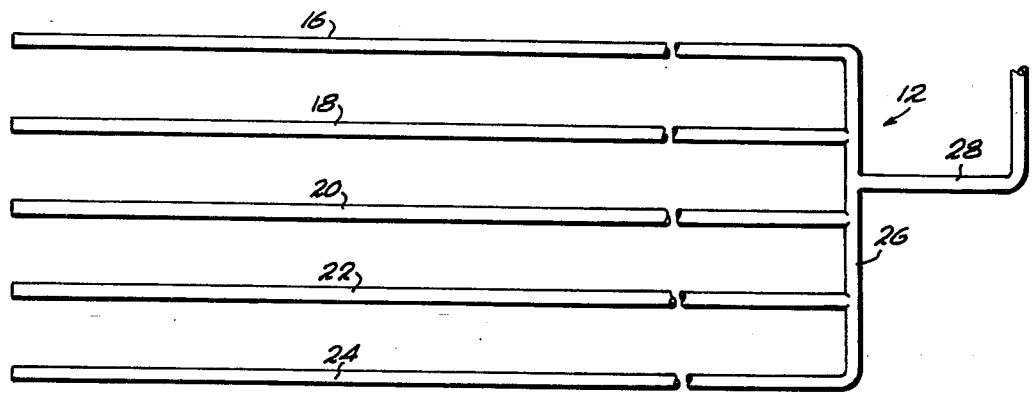
FIG. 1 is a plan view of an irrigation system composed of parallel pipe runs as seen from above with the soil removed.

Referring to the drawings, the system 12 is embedded in a field. It includes a plurality of parallel interconnected generally equilength runs of pipe or tube, such as 16, 18, 20, 22 and 24 which are connected together by a supply conduit 26 and thence to a source line 28 by suitable connectors, not shown. The pipes may be of rigid polyvinyl chloride as is well known; and in such a system the parallel runs may be between 200 and 700 feet in length in a preferred range. Preferably along each of the pipes of the parallel runs there is a plurality of equispaced holes in the downside face. The holes are of common size to receive a valve in each.

Figure 3:
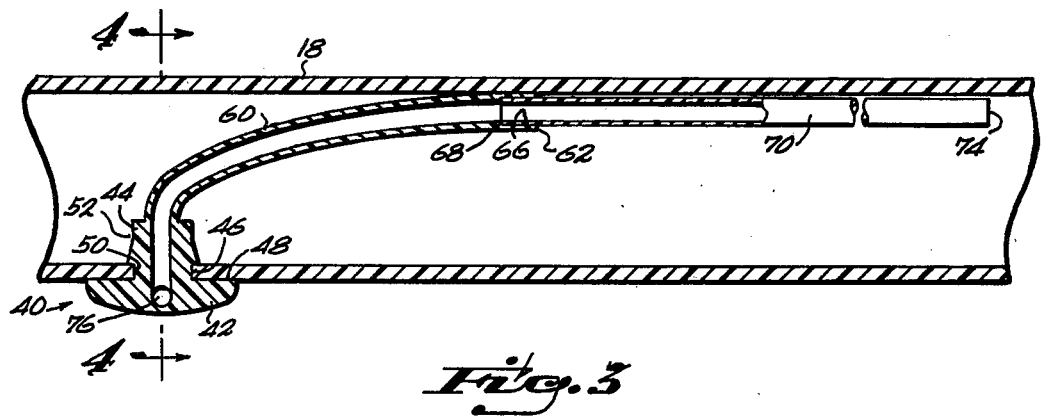
FIG. 3 is a view in cross section of a zone of FIG. 2.
Figure 4:
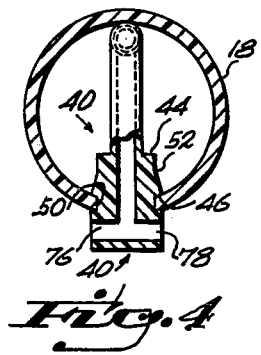
FIG. 4 is a view in cross section taken on the plane indicated by the line 4—4 of FIG. 3 and looking in the direction of the arrows.
Figure 5:
FIG. 5 is an enlarged partial view, which is partially in cross section, of a portion of the central zone of FIG. 3.

Referring to FIG. 3 there is shown one of the flow control valves generally designated by the numeral 40. It includes a dome-shaped foot 42 and an upstanding near or upper leg portion 44 and elongate lower or extended leg portion 60, the foot and leg portions being of an integral molded construction of polyethylene or polypropylene, which is not in the rigid range, so as to be somewhat flexible or pliable. The leg portions have a longitudinally extending hole from the free end to the lateral exit holes or ports in this foot. Each valve has an annular recess 46 defining a seat between the foot and near or upper leg portion defining a shoulder at the underside of the foot and a recess 46 at the upstanding leg juncture with the foot. The leg is sized for insertion depthwise through one of the holes to seat in snap-type engagement. Upon insertion the recess is captivated by the margin of the pipe about the opening 50. It is seen that the exterior of the leg is slightly tapered as at 52 so as to guide the valve to the seated position; i.e., it is adapted to be press-fitted with the annular margin about the opening 50 of the hole through the pipe nested in the seat defining recess 46. The leg is of a longitudinal length greater than the diameter of the pipe in which it is situated so that the extended or lower leg portion is flexed or curved with its terminal portion, that is the lower leg portion 60 overlaying the opposite interior surface of the pipe. The leg end 62 is preferably internally recessed as at 66 defining an interior shoulder 68. In abutment with this shoulder and sized for receipt in the leg end 62 there is a tubular length 70 also of flexible molded plastic material, which length is of predetermined and preselected length.

Figure 2:
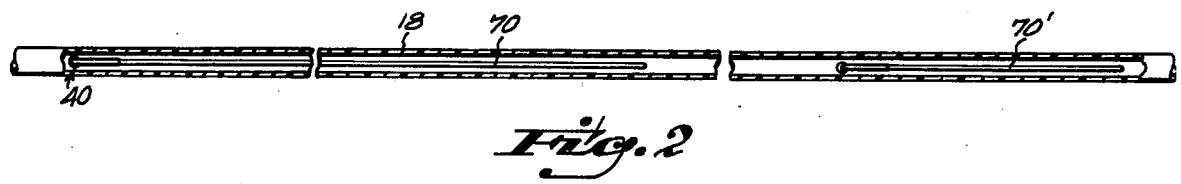
FIG. 2 is a plan view partly in cross section of a portion of a pipe run with the source being to the left of this Figure.

It will be seen that water entering the open end 74 of the tubular length 70 will pass through the tube and leg portions and out of the pipe through the lateral passageways 76 and 78 of the foot for irrigating. The foot and leg plus the particular length of tube 70 which is selected comprises a valve means wherein the length of the tube 70 determines the friction presented to the water flow exiting from the pipe. To control the water flow from a hole, the length of the tube 70 is selected suitably for its location in the system. Thus the length of the tube 70 will vary from hole to hole along the pipe as is indicated in FIG. 2 in which the shorter length is designated by the numeral 70'. This, in turn, comprises a valve means so that, along the length of the parallel pipe runs of the irrigation system the tubular length 70 of the valve in each opening is proportional to the relative location of the hole in relation to the source in order to determine the amount of water flow generally through the valve opening or pipe hole.

Referring now to the molded construction of the valve, it will be seen that the zone of juncture between the thin tubular upper leg portion or extension and the relatively thick lower leg portion in general comprises a hinge or knee zone to accommodate bending or flexing of the lower leg 60 of the valve relative to the upper leg portion 44. In a preferred embodiment the longitudinal dimension of the foot is about one-half inch and about one-quarter inch in lateral dimension and about one-eighth in projecting thickness outwardly. The seat or annular recess is about one-sixteenth inch across and one-thirty second of an inch deep. The tapered upper leg zone 52 is about one-quarter inch in length and this extended length which is thinner is about one and one-quarter inch long with the terminal end recess being about one-quarter inch long and one-sixteenth inch in diameter. The inside diameter of the hole and passageway is about one-thirty second of an inch preferably. The tubular extension is one-eighth inch in outside diameter and one-sixteenth inch in inside diameter. The holes in the pipe are about 2 to 4 feet apart.

What is claimed is:

1. For use in pipes of a subsurface water distribution irrigation system, a valve means to control water flow through downwardly facing, similar sized, longitudinally spaced holes along the pipes, said valve means comprising:

an integral plastic member including a foot and a leg, said foot comprising a body having an outer and an inner exterior surface and side faces between the surfaces and said body having a hole extending from the first face toward but not to the second face and a laterally extending port in each side face communicating with the hole, said inner face being sized to nest in covering relation of one of the holes in the pipe with the hole in the body in registry with one of the holes in the pipe, said leg being tubular and extending from the body in fluid communication with the body hole, said leg having an upper relatively thick portion of an axial length substantially less than the inside diameter of the pipe and said upper relatively thick portion being connected to the body, and a lower relatively thin portion extending from the relatively thick portion to a terminal end, the length of said leg being substantially greater than the inside diameter of the pipe, said relatively thin portion being bendable and said leg being sized for insertion into one of the pipe holes, whereby water passing from the interior of the pipe through the leg is adapted to be dispersed laterally through the foot ports, a seat comprising a sealing means at the juncture of the upper leg portion and the inner foot face to sealingly nest about the margin of one of the pipe holes, and a preselected tubular length connected to the terminal end of the leg, and means for interconnecting the tubular length to the leg.

2. The device as set forth in claim 1 wherein said means for interconnecting the tubular length to the leg comprises a recess in the terminal end and said tubular length is sized for telescoping receipt in the recess.

3. The device as set forth in claim 1 wherein the valve means and tubular length are of polyethylene plastic material.

4. The device as set forth in claim 1 wherein said sealing means comprises an annular recess.

5. The device as set forth in claim 4 wherein said thicker leg portion comprises an exterior surface which diverges toward the seat and which said seat is of a diameter slightly larger than the diameter of the holes in the pipe to adapt the same for press-fitting into the pipe with the margin of the hole in the pipe being adapted to be captivatingly nested in the seat.

6. The device as set forth in claim 1 wherein the outer face of the foot is dome-shaped.

* * * * *